US012000686B2

(12) United States Patent
Major et al.

(10) Patent No.: US 12,000,686 B2
(45) Date of Patent: Jun. 4, 2024

(54) RECONFIGURABLE EXPLOSIVES MATERIALS TRANSPORT AND DELIVERY SYSTEM (71) Applicant: Orica International Pte Ltd, Singapore (SG)

(72) Inventors: Bryce Owen Major, Cameron Park (AU); Brett Jason Cumming, Tasmania (AU); Mark Justin Willington, Carina (AU)

(73) Assignee: Orica International Pte Ltd, Singapore (SG)

( * ) Notice: Subject to any disclaimer, the term of this patent is extended or adjusted under 35 U.S.C. 154(b) by 885 days.

(21) Appl. No.: 15/733,563

(22) PCT Filed: Feb. 26, 2019

(86) PCT No.: PCT/SG2019/050103
§ 371 (c)(1),
(2) Date: Aug. 27, 2020

(87) PCT Pub. No.: WO2019/168469
PCT Pub. Date: Sep. 6, 2019

(65) Prior Publication Data
US 2020/0408495 A1 Dec. 31, 2020

(30) Foreign Application Priority Data

Feb. 27, 2018 (SG) .......................... 10201801582Y (51) Int. Cl.
F42D 1/10 (2006.01)
B01F 35/71 (2022.01)
(Continued)

(52) U.S. Cl.
CPC .......... *F42D 1/10* (2013.01); *B01F 35/71775* (2022.01); *B01F 35/75* (2022.01); *B65G 33/10* (2013.01); *B65G 47/19* (2013.01)

(58) Field of Classification Search
CPC .. E04G 21/04; B28C 7/00; B28C 7/02; B28C 5/0875; B28C 9/04; B28C 7/0454;
(Continued)

(56) References Cited

U.S. PATENT DOCUMENTS 3,215,408 A * 11/1965 Hansen ................. B01F 33/502
D15/147
3,424,438 A * 1/1969 Beyer .................... B01F 33/502
366/168.1
(Continued)

FOREIGN PATENT DOCUMENTS

CN 201527239 U 7/2020
JP 2005-201611 A 7/2005
(Continued)

OTHER PUBLICATIONS

International Search Report and Written Opinion of International Searching Authority for Application No. PCT/SG2019/050103, dated May 30, 2019 (9 pages).
(Continued)

*Primary Examiner* — Charles Cooley
(74) *Attorney, Agent, or Firm* — Nixon Peabody LLP (57) ABSTRACT A supply system supplies an explosives material and comprises an explosives material delivery mechanism, a bin, a first outlet, a first removable cover, a port and an operation tool. The bin has an upper end, a lower end, and an interior volume that provides a first compartment for storing the explosives material. The first compartment has a corresponding lower end. The first outlet at the lower end of the first compartment feeds the explosives material from the first
(Continued)

compartment to the explosive material delivery mechanism. The first removable cover is placed on a second outlet at the lower end of the compartment. The port is at the upper end of the bin by which the explosives material is loadable into the first compartment. The operation tool allows installation and removal of the first removable cover by way of the port without requiring any personnel to enter into the bin.

20 Claims, 7 Drawing Sheets

(51) Int. Cl.
   *B01F 35/75* (2022.01)
   *B65G 33/10* (2006.01)
   *B65G 47/19* (2006.01)

(58) Field of Classification Search
   CPC ..... B28C 7/044; B28C 9/0454; B28C 7/0418; B28C 7/0422; B28C 7/0477; B28C 7/10; B28C 9/0481; B28C 9/049; B01F 15/0235; B01F 15/00538; B01F 15/00519; B01F 2215/0081; B01F 35/71731; B01F 35/32025; B01F 35/3204; B01F 2101/49; B01F 33/805; B01F 35/71775; B01F 33/823; B01F 35/75; F01D 15/08; F01D 15/10; F02C 3/22; F04B 49/20; F04B 19/22; F04B 17/03; F04B 17/06; F04B 23/00; F04B 47/02; F04B 49/065; H02P 23/00; E21B 43/267; E21B 43/26; E21B 43/2607; B65G 33/18; B65G 47/19; B65G 33/10; Y02P 70/10; F42D 1/10; F42D 5/04; F42B 39/20; F42B 39/14
   USPC .... 366/14–20, 27–29, 33–35, 64–66, 37–38, 366/31–32, 50–51, 41, 154.1–158.4, 366/183.1
   See application file for complete search history.

(56) References Cited

U.S. PATENT DOCUMENTS

| 7,270,470 | B1 * | 9/2007 | Johnson | B01F 35/71 366/76.9 |
| 8,827,738 | B2 | 9/2014 | Lownds | |
| 2015/0003186 | A1 * | 1/2015 | Xue | F42D 1/10 366/151.1 |

FOREIGN PATENT DOCUMENTS

| RU | 2285901 C1 | 10/2006 | |
| RU | 2304756 C1 | 8/2007 | |
| WO | WO 2008/139413 A1 | 11/2008 | |
| WO | WO-2019168469 A1 * | 9/2019 | ............. B65G 33/10 |

OTHER PUBLICATIONS

Famesa Explosivos; "Technical data of pumpable mixer truck," with partial English translation; 2014 (6 pages).

* cited by examiner

RECONFIGURABLE EXPLOSIVES MATERIALS TRANSPORT AND DELIVERY SYSTEM

RELATED APPLICATIONS

The present application is a U.S. National Stage of International Application No. PCT/SG2019/050103, filed on Feb. 26, 2019, which claims the benefit of Singaporean Patent Application No. 10201801582Y, filed on Feb. 27, 2018, each of which is hereby incorporated herein by reference in its entirety.

TECHNICAL FIELD

The present disclosure relates to transport and delivery of explosives materials (e.g., tertiary high explosives materials) and equipment for that purpose, including to apparatuses and methods for supplying an explosives material.

BACKGROUND

A mobile manufacturing unit (MMU), sometimes referred to as mobile processing unit, is a purpose-built piece of equipment (commonly a vehicle) that is used in commercial mining operations to transport constituents of explosives materials to the location or site where the explosives materials are to be used. The MMU delivers explosives material(s) directly to or into a blasthole or borehole using a suitable delivery mechanism. This will be an auger for the delivery of dry, flowable explosive materials such as ammonium nitrate prill, or a pump for the delivery of liquid-form explosives materials such as emulsion explosives. In the case of emulsion explosives, typically a base emulsion is sensitized just before or during delivery to or into the blasthole.

The MMU includes a storage tank system for one or more explosives materials, with one or more outlets that feed a given explosives material to an appropriate type of delivery mechanism. The MMU can be equipped to deliver a particular type of explosives material into a blasthole. In this case, the delivery mechanism used is specific to the type of explosives material being delivered. To provide enhanced flexibility with respect to the types of explosives materials that the MMU can deliver, it is known to use MMUs that are not restricted to the supply of a single or single type of explosives material, but which can be adapted or configured to supply different or different types of explosives materials as required, such as by way of multiple internal storage tanks, chambers, or compartments.

It is possible for a storage tank, chamber, or compartment within an MMU that has been used to deliver a batch of ammonium nitrate prill to be subsequently configured to deliver an emulsion explosive. However, changing the configuration of this type of MMU is conventionally labour-intensive and requires personnel to climb inside the storage tank(s) of the MMU and undertake manual cleaning operations to ensure that each storage compartment that is being reconfigured to handle a different type of explosives material is thoroughly and properly cleaned, and then make manual adjustments to ensure that the correct delivery system for the explosives material under consideration will be operative post-reconfiguration.

It would be desirable to provide a storage/supply system (e.g., for an MMU) that can more readily and more efficiently be converted for delivery of different types of explosives materials, which may enhance productivity and operational flexibility, or to at least provide a useful alternative.

SUMMARY

Described herein is an apparatus including a supply system that is adapted for supplying at least a first explosives material, the supply system comprising:
  at least a first explosives material delivery mechanism;
  a bin having an upper end, a lower end, and an interior volume that provides at least a first compartment for storing an explosives material, the first compartment having a corresponding lower end;
  at least a first outlet provided at the lower end of the compartment for feeding the first explosives material from the first compartment to the first explosives material delivery mechanism;
  at least a first removable cover for a second outlet at the lower end of the compartment, and installable thereon and removable therefrom;
  a port provided at the upper end of the bin by which the explosives material is loadable into the first compartment; and
  an operation tool that is adapted to allow installation and removal of the first removable cover by way of the port without requiring any personnel to fully or partially enter into the bin.

Also described herein is the apparatus wherein the supply system comprises:
  a second explosives material delivery mechanism;
  the second outlet provided at the lower end of the compartment for feeding a second explosives material from the first compartment to the second explosives material delivery mechanism; and
  a second removable cover for the first outlet, and installable thereon and removable therefrom, wherein the operational tool is adapted to allow installation and removal of the second removable cover by way of the port without requiring any personnel to fully or partially enter into the bin.

Also described herein is the apparatus comprising a mechanical platform for transporting the supply system.

Also described herein is the apparatus wherein the operation tool comprises an elongate structure with:
  a gripping portion or handle at one end, and a cover engagement and actuation mechanism, structure, element, or means at the other end; and/or
  one or more robotic manipulators, actuators, or arms having a cover engagement and actuation mechanism, structure, element, or means at a distal end.

Also described herein is the apparatus wherein the bin comprises one or more non-configurable compartments, and the compartments may be formed by subdividing the bin.

Also described herein is the apparatus wherein the first explosives material delivery mechanism comprises at least one pump and/or at least one auger.

Also described herein is the apparatus wherein the first explosives material delivery mechanism and the second explosives material delivery mechanism are of the same type as each other.

Also described herein is the apparatus wherein the first removable cover comprises at least one sealing, retention, and/or clamping mechanism to secure the cover over the second outlet, wherein the clamping mechanism of the removable cover can be activated/deactivated using the operation tool without requiring any personnel to fully or partially enter into the bin, wherein the cover is optionally held against the second outlet by the clamping mechanism engaging to an underside of a rim of the second outlet.

Also described herein is the apparatus wherein the second outlet comprises a corresponding rim structure or rim against which predetermined peripheral portions of an underside of the first removable cover rest when the first removable cover is seated over the second outlet.

Also described herein is the apparatus wherein the first removable cover comprises a cover engagement interface by which a tool engagement interface of the operation tool can matingly engage with and operate or manipulate the first removable cover.

Also described herein is the apparatus wherein the hatch engagement interface includes or is a torque receiver for receiving torque from the operation tool, and which is engageable by the tool engagement interface of the operation tool, and optionally the torque receiver includes or is a projection that extends from an upper surface of the first removable cover, and the tool engagement interface of the operation tool includes a torque transmitter for transmitting the torque to the torque receiver, and optionally the torque transmitter includes or is a recess or socket for engaging the projection of the removable cover.

Also described herein is the apparatus wherein the hatch engagement interface includes or is a lifting-force receiver for receiving a lifting force from the operation tool, and which is engageable by the tool engagement interface of the operation tool, and optionally the lifting-force receiver includes or is a projection that extends from an upper surface of the first removable cover, and the tool engagement interface of the operation tool includes a lifting-force transmitter for transmitting the lifting force to the lifting-force receiver, and optionally the lifting-force transmitter includes or is a hook for engaging the projection of the removable cover.

Also described herein is the apparatus wherein the hatch engagement interface includes or is a pushing-force receiver for receiving a pushing force from the operation tool, and which is engaged by the tool engagement interface of the operation tool, and optionally the pushing-force receiver includes or is a projection that extends from an upper surface of the first removable cover, and the tool engagement interface of the operation tool includes a pushing-force transmitter for transmitting the pushing force to the pushing-force receiver, and optionally the pushing-force transmitter includes or is a recess or socket for engaging the projection of the removable cover.

Also described herein is the apparatus wherein the supply system comprises at least one shedder for placing over the first removable cover to facilitate or ensure flow of the first explosives material to other outlets that are uncovered, wherein the shedder includes a shedder engagement interface that allows the shedder to be positioned and removed using the operation tool by way of the port without requiring any personnel to fully or partially enter into the bin, wherein the shedder engagement interface optionally includes or is a projection that extends from an upper surface of the shedder.

Also described herein is a method for supplying at least a first explosives material comprising:
  installing a first removable cover over a first outlet at a lower end of a compartment using an operation tool by way of a port at an upper end of the compartment without requiring any personnel to fully or partially enter into the compartment, wherein the installing optionally includes applying a locking torque to the first removable cover using the operation tool;
  loading the first explosives material into the compartment by the port;
  storing the first explosives material in the compartment; and
  feeding the first explosives material from the compartment to a first explosives material delivery mechanism by a second outlet at the lower end of the compartment.

Also described herein is the method including any one or more of:
  cleaning the first explosives material by way of the port from the compartment without requiring any personnel to fully or partially enter into the compartment;
  unlocking the first removable cover by way of the port without requiring any personnel to fully or partially enter into the bin, optionally by applying a pushing force and then an unlocking torque to the first removable cover using the operation tool;
  removing the first removable cover by way of the port without requiring any personnel to fully or partially enter into the bin, optionally by applying a lifting force to the first removable cover using the operation tool;
  installing a second removable cover over the second outlet using the operation tool by way of the port without requiring any personnel to fully or partially enter into the compartment;
  loading a second explosives material into the compartment by the port;
  storing the second explosives material in the compartment;
  feeding the second explosives material from the compartment to a second explosives material delivery mechanism by the second outlet;
  transporting the compartment by a mechanical platform;
  manipulating the operation tool using a handle or one or more robotic manipulators, actuators, or arms;
  subdividing the bin to form the compartments, including non-configurable compartments; clamping the first removable cover over the second outlet, optionally by engaging to an underside of a rim of the second outlet;
  engaging the operation tool with the first removable cover, optionally including transmitting torque, transmitting a lifting-force and/or transmitting a pushing force; and
  placing a shedder over the first removable cover to facilitate or ensure flow of the first explosives material to the second outlet that is uncovered, including positioning the shedder using the operation tool by way of the port without requiring any personnel to fully or partially enter into the bin.

BRIEF DESCRIPTION OF THE DRAWINGS

Embodiments of the invention are hereinafter described with reference to the following non-limiting drawings.

DETAILED DISCUSSION

Throughout this specification and the representative non-limiting examples or example embodiments which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavour to which this specification relates.

In this specification, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "I" in a FIG. or associated text is understood to mean "and/or" unless otherwise indicated. The recitation of a particular numerical value or value range herein is understood to include or be a recitation of an approximate numerical value or value range (e.g., to within +/−20%, +/−15%, +/−10%, +/−5%, +/−2.5%, +/−1%, or +/−0%).

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)). In general, an element of a set can include or be a system, an apparatus, a device, a structure, an object, a process, a physical parameter, or a value depending upon the type of set under consideration. Thus, a set of elements can be interpreted or defined as including one or more elements, or at least one element.

In an embodiment, the present disclosure provides a supply system that is adapted for supplying an explosives material, the supply system comprising:

a first explosives material delivery mechanism;

a second explosives material delivery mechanism;

a bin having an upper end, a lower end, and an interior volume that provides at least a first compartment for storing an explosives material;

a first outlet provided at the lower end of the bin or compartment for feeding explosives material from the first compartment to the first explosives material delivery mechanism;

a second outlet provided at the lower end of the bin or compartment for feeding explosives material from the first compartment to the second explosives material delivery mechanism;

a removable cover for each outlet, and installable thereon and removable therefrom;

a port provided at the upper end or top of the bin by which the explosives material is loadable into the first compartment; and an operation tool that is adapted to allow installation and removal of the removable cover by way of the port, without requiring any personnel to fully or even partially enter into the first compartment and/or the bin.

In use, the supply system forms part of a mobile manufacturing unit (MMU) equipped with ancillary equipment for the manufacture and/or delivery of explosives material(s) (e.g., tertiary high explosives material(s)) to or into a blasthole. The ancillary equipment will be readily understood by individuals having ordinary skill in the relevant technological art. Accordingly, the present disclosure also provides an MMU comprising a supply system in accordance with the disclosure. The MMU typically takes the form of a mechanized platform such as a self-propelled vehicle, for instance, a truck.

The disclosure also provides a method of loading a blasthole with one or more explosives materials, which comprises using a MMU in accordance with the disclosure.

Described herein is an explosives materials supply system that can be readily configured to deliver different or different types of explosives materials that require the use of different explosives materials delivery or conveyance systems, subsystems, or mechanisms, and which can enable the selectable or selective delivery of one or more explosives materials into one or more blastholes (e.g., the selective delivery of compositionally or chemically distinguishable explosives materials into a single blasthole, and/or multiple blastholes) by way of distinct or different delivery mechanisms. The supply system includes delivery mechanisms specific to the range or types of explosives materials one might want to use in the field in blasting operations (e.g., commercial blasting operations performed as part of mining, quarrying, or commercial tunneling procedures using commercial explosives materials, such as tertiary high explosives materials).

The supply system comprises a bin having at least one internal chamber or compartment, and typically multiple internal compartments, in which explosives materials can be carried. At least some of the internal compartments include (i) a selectively exposable or coverable outlet or set of outlets (e.g., a first outlet or a first set of outlets) that in use allows a dry flowable or augerable explosives material to be directed to a particular delivery mechanism (e.g., a first delivery mechanism); and (ii) a selectively exposable or coverable outlet or set of outlets (e.g., a second outlet or a second set of outlets) that in use allows a liquid-form or pumpable explosives material to be directed to another delivery mechanism (e.g., a second delivery mechanism). Hence, in various embodiments the first delivery mechanism includes at least one auger (e.g., a single auger, or dual augers), and the second delivery mechanism includes at least one pump (e.g., a single pump, or possibly dual pumps). Correspondingly, the first delivery mechanism includes a conduit or channel corresponding to each auger, and the second delivery mechanism includes a conduit or channel corresponding to each pump, by which explosives materials output by the supply system are delivered or introduced to or into blastholes in a manner readily understood by individuals having ordinary skill in the relevant art. In representative example embodiments, the first delivery mechanism would be useful for metered delivery of ammonium nitrate prill (AN); and the second delivery mechanism would be useful for metered delivery of an emulsion explosive (e.g., ammonium nitrate emulsion (ANE)).

Removable covers are provided for each aforementioned outlet or set of outlets, which enables the system to be configured so that the appropriate delivery mechanism is employed based on the type of explosives material that is carried by a given compartment of the bin and which is to be delivered during a particular time interval or at a particular time. To selectively or selectably prevent or avoid the flow or transfer of a particular type of explosives material within one or more portions or compartments of the bin to a given, undesired, unintended, or incorrect delivery mechanism, an appropriate removable cover or set of covers is secured over the outlet(s) in those portions or compartment(s) of the bin that carry the particular explosives material under consideration, and which would otherwise undesirably or unintentionally feed that delivery mechanism. Selectively securing the covers over particular outlets in the bin while keeping other outlets in the bin open or exposed occurs before the bin is loaded with explosives material(s). For example, if one or more portions of the supply system, e.g., one or more bin compartments, will be used with AN, the outlet(s) for the ANE pump(s) in the bin portions or compartment(s) in which AN will be loaded should be covered, and the outlet(s) for feeding the AN auger(s) left open. AN can subsequently be selectively loaded into the bin compartment(s) in which the outlet(s) for the ANE pump(s) are covered or blocked. Additionally or alternatively, if one or more portions of the supply system, e.g., one or more bin compartments, will be used with ANE, the outlet(s) for the AN auger(s) in the bin compartment(s) in which ANE will be loaded should be covered, and the outlet(s) for feeding the ANE pump(s) left open. ANE can subsequently be loaded into the bin compartment(s) in which the AN auger outlet(s) remain covered or blocked.

A key feature of the present disclosure is that the outlets and the removable covers corresponding thereto can be configured (e.g., the covers can be selectively, selectably, or customisably removed and installed) by way of at least one opening or port formed in the bin, e.g., at the top of the bin, using a suitably designed bin configuration or operation apparatus, mechanism, or tool. Moreover, the outlets and removable covers therefor can be configured externally, i.e., from outside the bin without personnel needing to be fully or even partially within the bin itself. In some embodiments, a bin configuration tool includes or is an elongate structure with a gripping portion or handle at one end, and a cover engagement and actuation mechanism, structure, element, or means at the other end. Aspects of particular representative embodiments of such a tool are described in more detail below. In other embodiments, a bin configuration apparatus or mechanism includes or is a semi-automated or automated mechanism such as one or more robotic manipulators, actuators, or arms having a cover engagement and actuation mechanism, structure, element, or means at a distal end. Aspects of certain representative embodiments of such an automated or semi-automated mechanism are also described in more detail below. For purpose of brevity, a bin configuration apparatus, mechanism, or tool (whether operated entirely manually or robotically) may be referred to hereafter as an operation tool.

The bin of the supply system comprises a container or housing for carrying one or more types of explosives materials. The bin typically includes multiple internal compartments formed in the container/housing, where at least some of the compartments have the features described (e.g., the bin includes multiple individually configurable compartments). This provides flexibility with respect to the range of explosives materials that may be carried and supplied. For example, a supply system providing a bin with two configurable compartments may be configured or used to supply AN from one compartment using an auger, and ANE from another compartment using a pump. Alternatively, both compartments may be configured to supply different grades or formulations of AN or ANE. The maximum number of compartments is usually four to six. It is also possible that the supply system comprises one or more configurable compartments as described, as well as one or more compartments of fixed design, i.e., non-configurable compartments. The compartments may be formed by subdividing the bin. In a non-limiting representative embodiment provided for purpose of example, a bin includes four compartments, at least some of which are (re)configurable, organized as a first compartment having an internal volume of 5.4 $m^3$; a second compartment having an internal volume of 4.2 $m^3$; a third compartment having an internal volume of 7.8 $m^3$; and a fourth compartment having an internal volume of 5.4 $m^3$. Depending upon embodiment details, a bin can provide one or more compartments having other internal volumes, and/or additional or fewer compartments, in a manner readily understood by any individual having ordinary skill in the relevant art.

In several embodiments, each compartment has a corresponding set of ports at its upper end. Explosives materials can be loaded into a given compartment by way of the port(s) corresponding to the compartment. When a compartment is configurable, the set of ports corresponding thereto can also provide access to the removable covers by way of the operation tool. When not in use, the port(s) will be closed by a cover, lid, or hatch.

In a number of embodiments, an MMU includes a double auger, and each bin compartment that can be configured for carrying AN includes two outlets that are positioned to feed respective augers. Such an MMU will also commonly include a single pump (suitable for ANE), and each compartment that can be configured for carrying ANE will therefore include only a single outlet to feed the pump.

The removable covers prevent explosives material from being directed to the incorrect delivery system. The covers are designed to fit over the outlets. It is conceivable that one or more covers can simply be dropped over a relevant corresponding outlet without the need for a particular type of clamping mechanism, or any clamping mechanism, for ensuring that the cover remains in place and preventing any unwanted delivery or leakage of explosives material through the covered outlet. However, it may be desirable for the cover to include at least one type of sealing, retention, and/or clamping mechanism to secure the cover over the relevant outlet. The clamping mechanism of the cover can be activated/deactivated using the operation tool.

Aspects of particular non-limiting representative embodiments of the invention will now be described with reference to the drawings.

Figure 1:
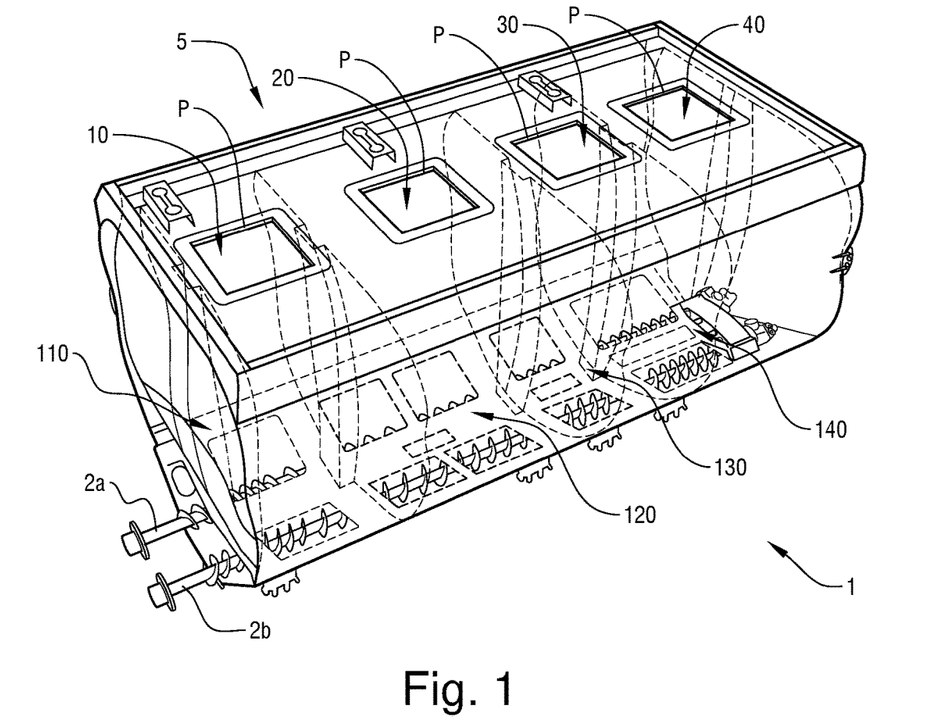
FIG. 1 is an illustration of portions of a supply system that includes a bin with internal compartments in accordance with one embodiment of the present disclosure.
Figure 2:
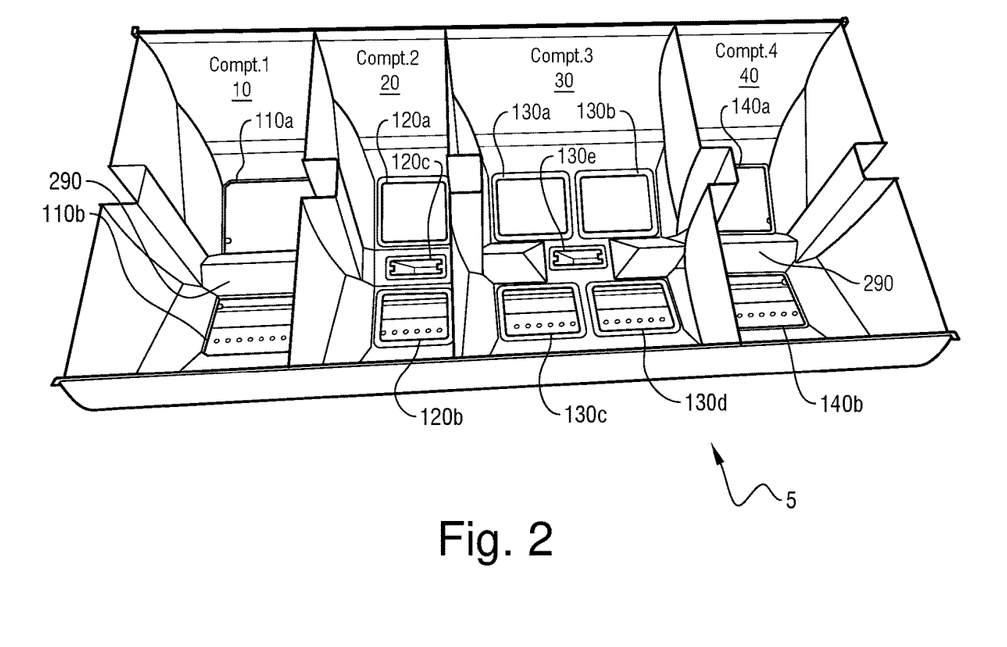
FIG. 2 is an illustration of the internal compartments of the bin in FIG. 1 in accordance with one embodiment of the present disclosure.

FIGS. 1 and 2 show portions of a supply system (1) in accordance with a representative embodiment of the present disclosure, comprising a bin structure or bin (5) made up of four internal chambers or compartments (10, 20, 30, 40). Each compartment (10, 20, 30, 40) has an access aperture or port (P) at its upper end. The supply system (1) includes two augers (2a-b) and a pump (not shown). Each compartment (10, 20, 30, 40) includes a corresponding set of outlets (110, 120, 130, 140) at its lower end. The arrangement of these sets of outlets (110, 120, 130, 140) in this embodiment is shown in more detail in FIG. 2.

With reference to FIG. 2, in this embodiment a first compartment (10) and a fourth compartment (40) are non-configurable or non-reconfigurable. These compartments (10, 40) are adapted to contain AN, and each has a set of outlets (110, 140) that will feed AN from the compartment (10, 40) to the augers (2a-b). Within the first and fourth compartments (10, 40), any outlet that would otherwise feed the ANE pump are covered, or such outlets are simply not provided in these compartments (10, 40). In contrast, each of a second compartment (20) and a third compartment (30) is selectively configurable to supply either AN or ANE by appropriate use of covers (not shown) over a respective set of outlets (120, 130). For instance, the second compartment (20) includes two outlets (120a-b) that in use (i.e., when uncovered) would feed augers (2a-b), and one outlet (120c) that in use (i.e., when uncovered) would feed a pump. The third compartment (30) includes four outlets (130a-d) that in use (i.e., when uncovered) would feed augers (2a-b), and one outlet (130e) that in use (i.e., when uncovered) that feeds a pump. In general, the number, position, and/or size of one or more of the outlets (110-140) may be varied based on factors such as compartment volumetric capacity, required or desired explosives material delivery rates, equipment (e.g., auger and/or pump) capabilities or rating, etc.

Figure 3:
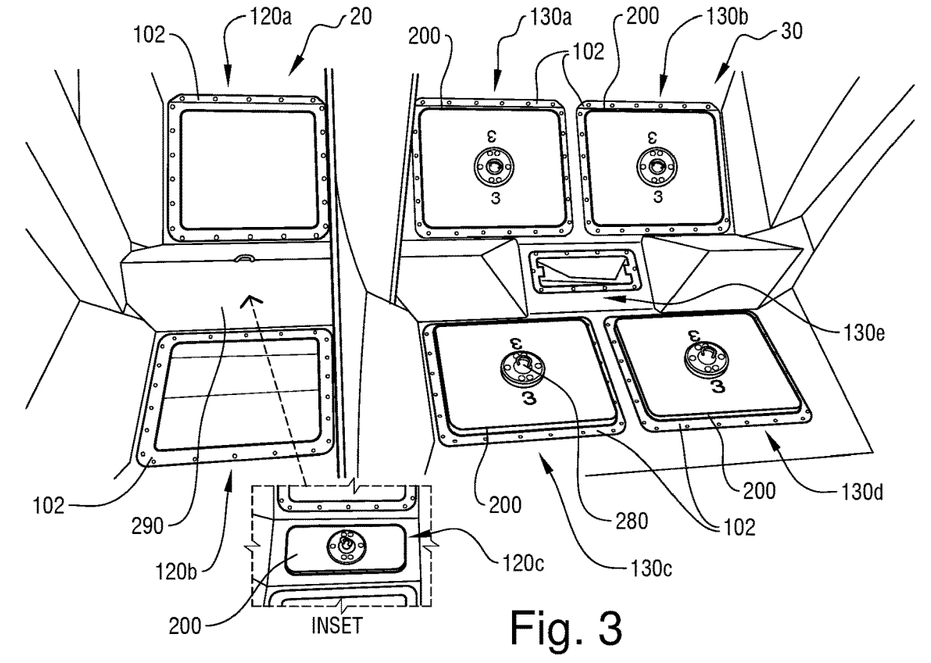
FIG. 3 illustrates a first variation to the compartments of the bin of FIGS. 1 and 2.

FIGS. 3-6 show various configurations for the second and third compartments (20, 30) of the bin (5) of FIGS. 1 and 2. In FIG. 3, the second compartment (20) is configured to allow explosives material to exit via outlets (120a-b) that feed augers (2a-b). The other outlet (120c) in the second compartment (20) (to the pump) is sealed by way of a removable cover or lid, which can be referred to as a compression hatch (200) shown in FIG. 3's inset. A shaped removable cover ("shedder") (290) can be placed over the compression hatch (200) to facilitate or ensure flow (e.g., smoother or smooth flow) of explosives material (AN) to the outlets (120a-b) that are uncovered. This is intended to prevent accumulation of explosives material over a compression hatch (200) over the outlet (120c) to the pump, and allow the second compartment (20) to empty its contents more readily under the force of gravity. In the configuration shown in FIG. 3, the second compartment (20) is configured to carry/store and deliver AN. In contrast, in the third compartment (30), the outlet (130e) to the pump is not covered, whereas the outlets (130a-d) to the augers (2a, 2b) are sealed using compression hatches (200). Hence, in the embodiment shown in FIG. 3, the third compartment (30) is configured to carry/store and deliver ANE. The bin (5) is structured or designed such that the side walls and floor of the third compartment (30) are inclined to favour the flow of ANE to the uncovered outlet (130d) to the pump. No shedder (290) over the uncovered outlet (130d) to the pump would be required in this case.

Figure 4:
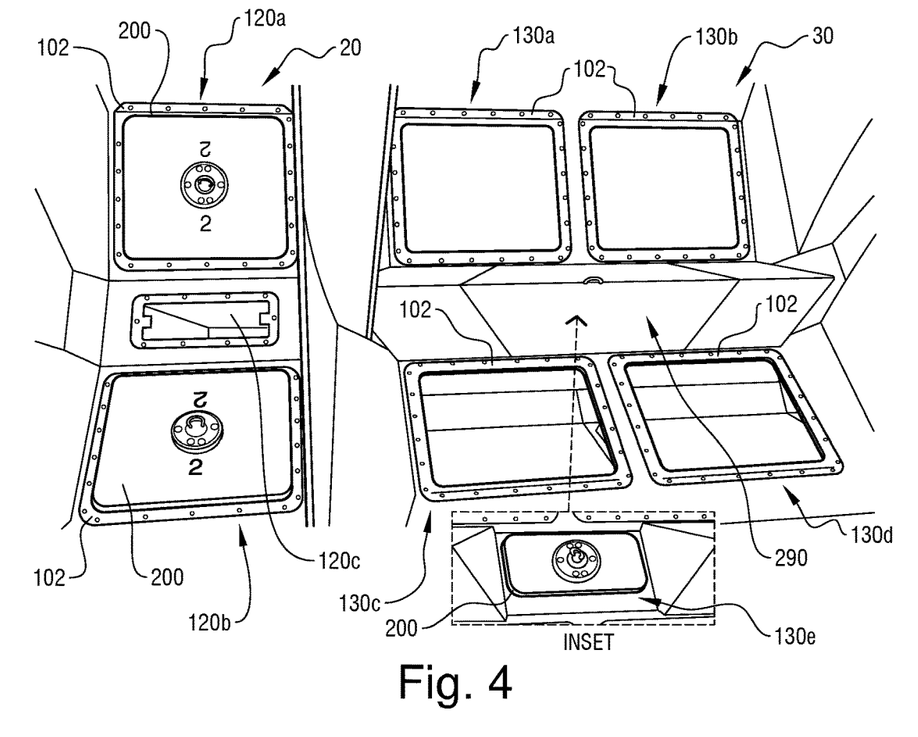
FIG. 4 illustrates a second variation to the compartments of the bin of FIGS. 1 and 2.

In FIG. 4, the second compartment (20) is configured to feed ANE to a pump, and hence the outlets (120a-b) of the second compartment (20) that expose the second compartment to the augers (2a-b) are covered by compression hatches (200), while the outlet (120c) by which ANE is conveyed to the pump remains uncovered or open. Again, the bin (5) is structured such that the side walls and floor of the second compartment (20) are shaped to favour the flow of ANE to this uncovered outlet (120c) so that no shedder (290) is required. In the third compartment (30), the outlets (130a-d) to the augers (2a, 2b) are not covered. The outlet (130e) to the pump is covered by a compression hatch (200), and the hatch (200) is covered with a suitably shaped shedder (290).

Figure 5:
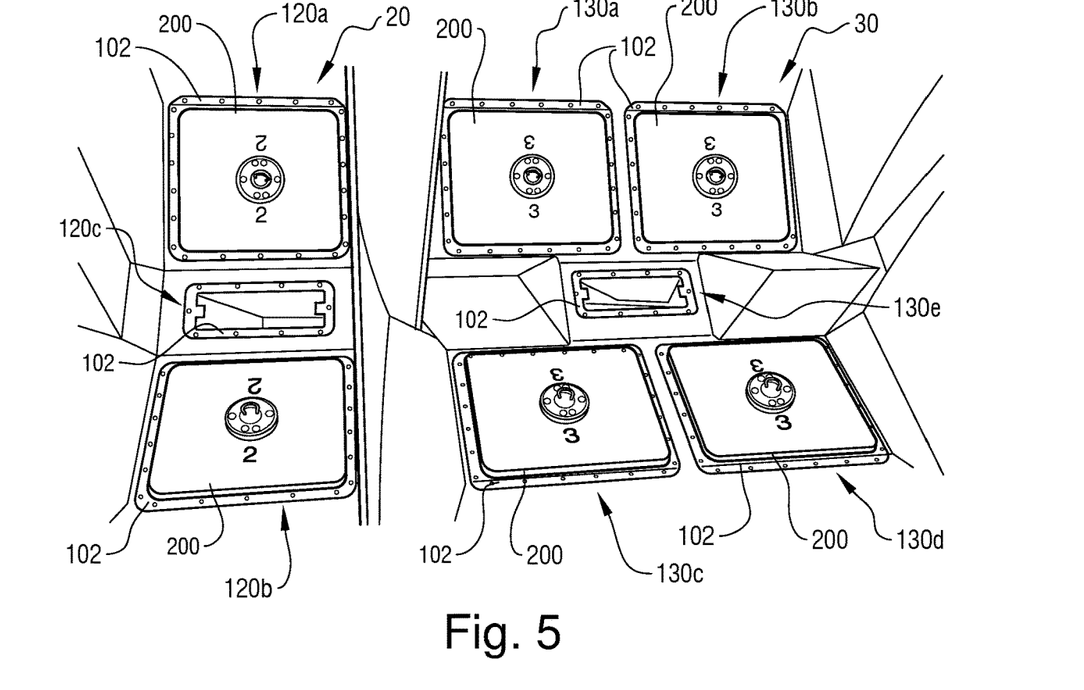
FIG. 5 illustrates a third variation to the compartments of the bin of FIGS. 1 and 2.

In FIG. 5, both the second compartment (20) and the third compartment (30) are adapted or configured for supplying ANE. Hence, all outlets (120a-b, 130a-d) to the augers (2a-b) are covered by compression hatches (200), whereas the outlets (120c, 130e) to the pump (i.e., one outlet (120c) in the second compartment (20), and one outlet (130e) in the third compartment (30)) are open.

Figure 6:
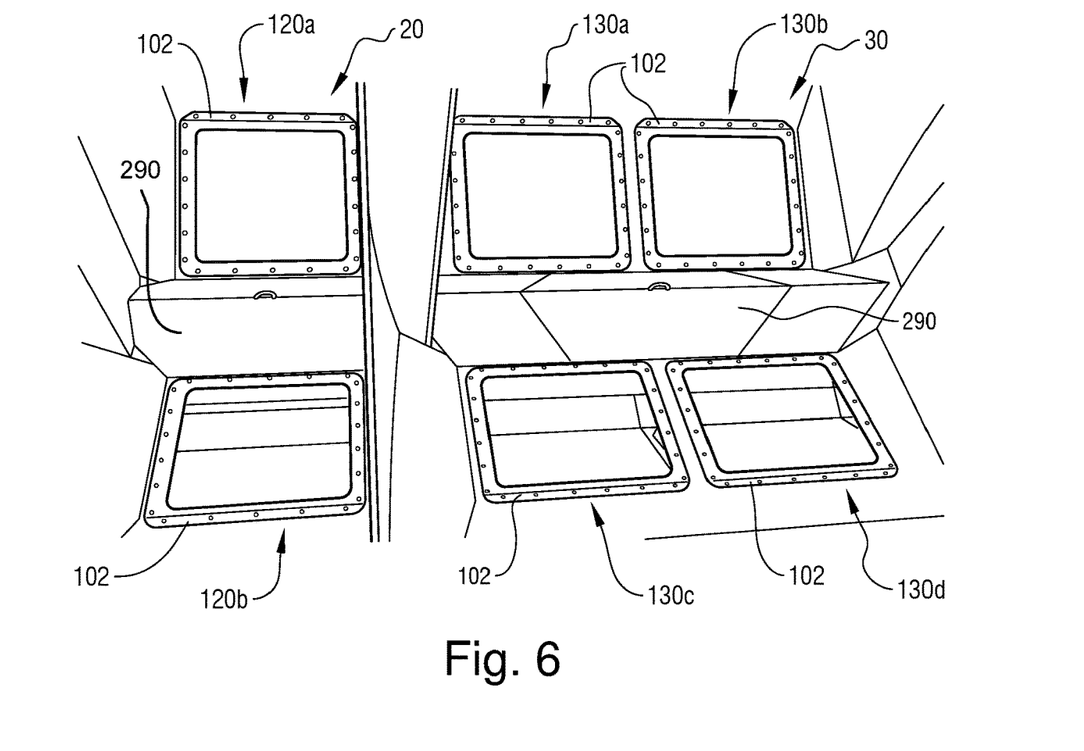
FIG. 6 illustrates a fourth variation to the compartments of the bin of FIGS. 1 and 2.

In FIG. 6, both the second compartment (20) and the third compartment (30) are adapted or configured for supplying AN. Consequently, the outlets (120c, 130e) to the pump are covered with compression hatches (200), and a shedder (290) provided over each hatch (200). The outlets (120a-b, 130a-d) to the augers (2a-b) are open.

As will be evident from FIGS. 3-6, compression hatches (200) that prevent the flow of AN to the augers (2a, 2b) can have a different shape and/or size compared to compression hatches (200) that prevent the flow of ANE to the pump, depending upon embodiment details.

Figure 10:
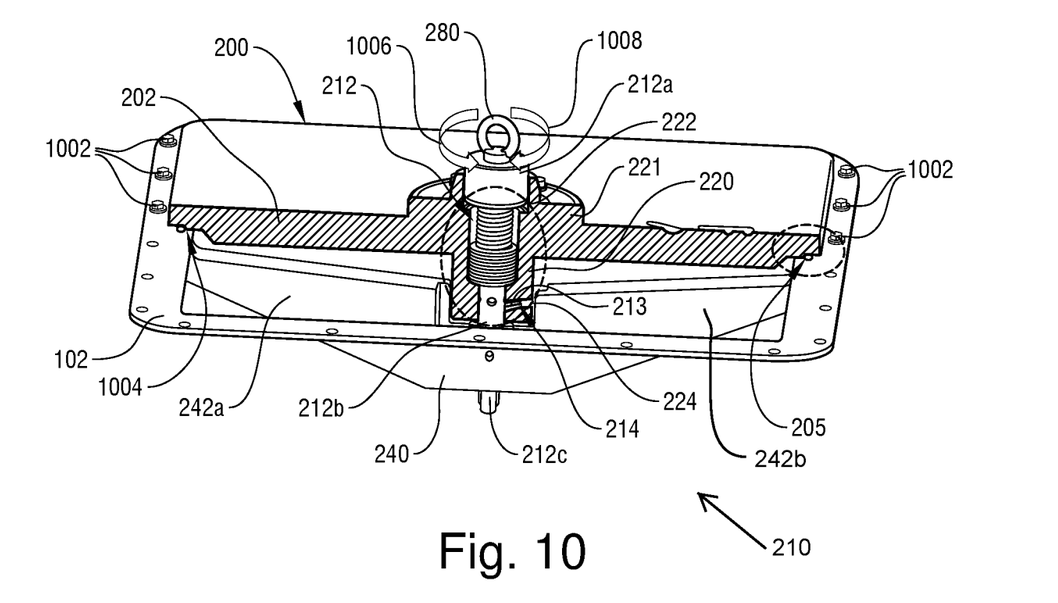
FIG. 10 illustrates a compression hatch and clamping mechanism in accordance with one embodiment of the present disclosure.

In several representative embodiments, as shown in FIG. 10, each outlet (120a-c, 130a-e) includes or has a corresponding a rim structure or rim (102) against which predetermined peripheral portions of the underside of a compression hatch (200) rest when the compression hatch (200) is seated over an outlet (120a-c, 130a-e). A given rim (102) may be secured to a corresponding outlet (120a-c, 130a-e) by way of fasteners (1002) such as bolts and nuts.

In various embodiments, the bin (5) of an MMU is purpose-designed and manufactured to provide a predetermined number of configurable compartments (20-30) therein. However, in certain embodiments, the bin of a pre-existing or conventional MMU may be modified for implementation of the invention. This may involve attachment of suitable rim mounts and/or rims (102) to outlets to enable engagement with compression hatches (200) in accordance with an embodiment of the disclosure. It may also be necessary to include structural supports to accommodate the drop-in shedders (290) in accordance with an embodiment.

As indicated above, in various embodiments any given outlet (120a-c, 130a-e) of a configurable compartment (20, 30) can be sealed using an appropriate (i.e., appropriately shaped and dimensioned) compression hatch (200). A compression hatch (200) may carry, form, or be coupled to a sealing and retention or clamping mechanism, which can be selectively activated to securely engage the compression hatch (200) to an outlet (120*a-c*, 130*a-e*), and deactivated to disengage the compression hatch (200) from the outlet (120*a-c*, 130*a-e*). A compression hatch (200) may be coupled to or carry a hatch engagement interface (or "cover engagement interface") by which a structural counterpart portion of the operation tool can matingly engage with and operate or manipulate the compression hatch (200). The structural counterpart portion may be referred to as a "tool engagement interface" or an "engagement portion".

The clamping mechanism may be activated/deactivated using the operation tool, by way of insertion of the operation tool through a compartment's port (P) to operate, manipulate, or access the clamping mechanism. The clamping mechanism seals and secures the compression hatch (200) around or to the rim (102) of the particular outlet (120*a-c*, 130*a-e*) that the hatch (200) covers. In several embodiments, the clamping mechanism is pivotable by way of the hatch engagement interface. The hatch engagement interface may include or be a projection that extends from the (upper surface of the) hatch (200), and which can be engaged by a portion (e.g., a distal end portion) of the operation tool. The projection is a form of torque receiver receives torque from the operation tool. The torque receiver may take the form of an eyebolt, T-shaped bolt, or other type of structure. Alternatively the torque receiver may include or be a depression, slot or aperture in the hatch engagement interface that receives torque from the operation tool. In this case, an engagement portion of the operation tool can include a suitably shaped counterpart structure such as a recess or socket configured for engaging with the eyebolt. The hatch (200) and operation tool may also be configured to allow the hatch (200) to be lifted (when removing from an outlet (120*a-c*, 130*a-e*)) or lowered (when applying to an outlet (120*a-c*, 130*a-e*)) using the operation tool. The hatch (200) may include a lifting-force receiver configured to receive a lifting force from the operation tool applied at the handle, i.e., by a person or robotic arm using the operation tool. The lifting-force receiver can be in the form of a projection from the upper surface of the hatch (200), such as an eyebolt or a hook, or a slot in its upper surface, such as a lip or rim, for receiving the lifting force. Correspondingly, the operation tool may include a lifting-force transmitter configured to transmit the lifting force from the operation tool to the lifting-force receiver. The lifting-force transmitter can be in the form of a suitably shaped arm member or hook that is sized to allow the hook to be inserted through the eyebolt or to mate with the projection of the hatch (200) or shedder (290). For ease of design/operation, the shedder (290) will also typically include a shedder engagement interface (281) including another lifting-force receiver, optionally in the form of a projection from its upper surface, such as an eyebolt, or a slot in its upper surface, such as a lip or rim, that allows the shedder (290) to be positioned and removed using the operation tool by application of the lifting force via the lifting-force transmitter.

In particular representative embodiments, the lateral or transverse dimensions of the compression hatches (200) for the outlets (120*a-b*, 130*a-d*) to the augers (2*a*, 2*b*) are typically 490 mm by 515 mm; and the lateral or transverse dimensions of the compression hatches (200) for the outlets (120*c*, 130*e*) to the pump are typically 480 mm by 230 mm. The weight of any given hatch (200) should not be excessive since it must be inserted into and lifted out of the bin (5), e.g., manually in certain embodiments. Typically, the weight of the hatch (200) is no more than 10 kg. The hatch (200) should be suitably rigid and robust. The hatch (200) should not be corrodible/corroded or be reactive to the explosives material(s) to which the hatch (200) would be exposed while in the bin (5). The same requirements apply to the shedder (290). Typically, the hatch (200) and shedder (290) will be made of one or more metallic (e.g., steel-based) materials; however, the hatch (200) and/or shedder (290) can additionally include or be made of one or more types of polymer materials.

Figure 7:
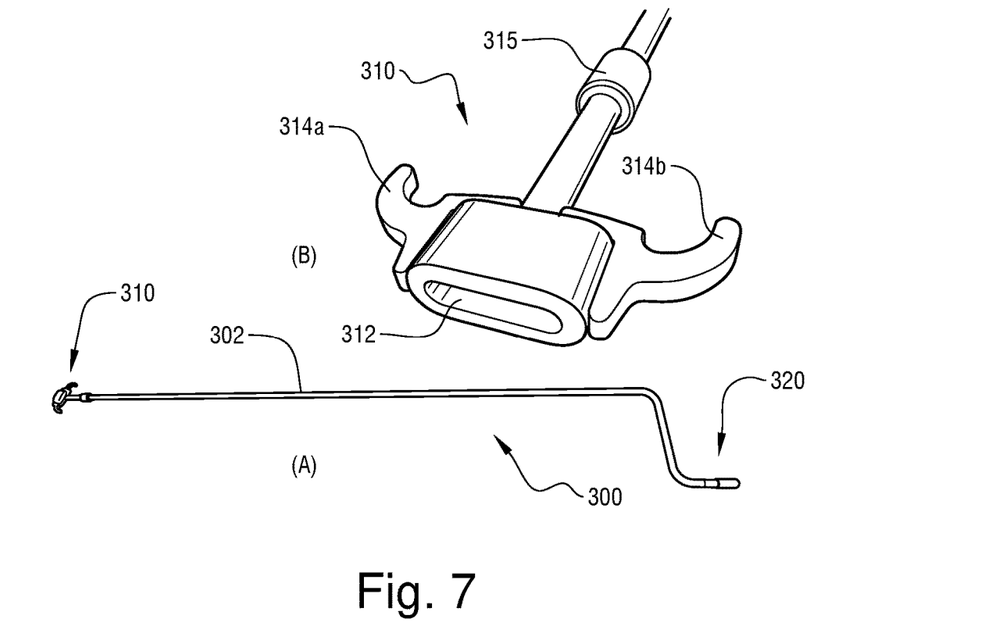
FIG. 7A illustrates one embodiment of an operation tool that is useful with the supply system.
FIG. 7B illustrates a distal end of the operation tool of FIG. 7A.
Figure 8:
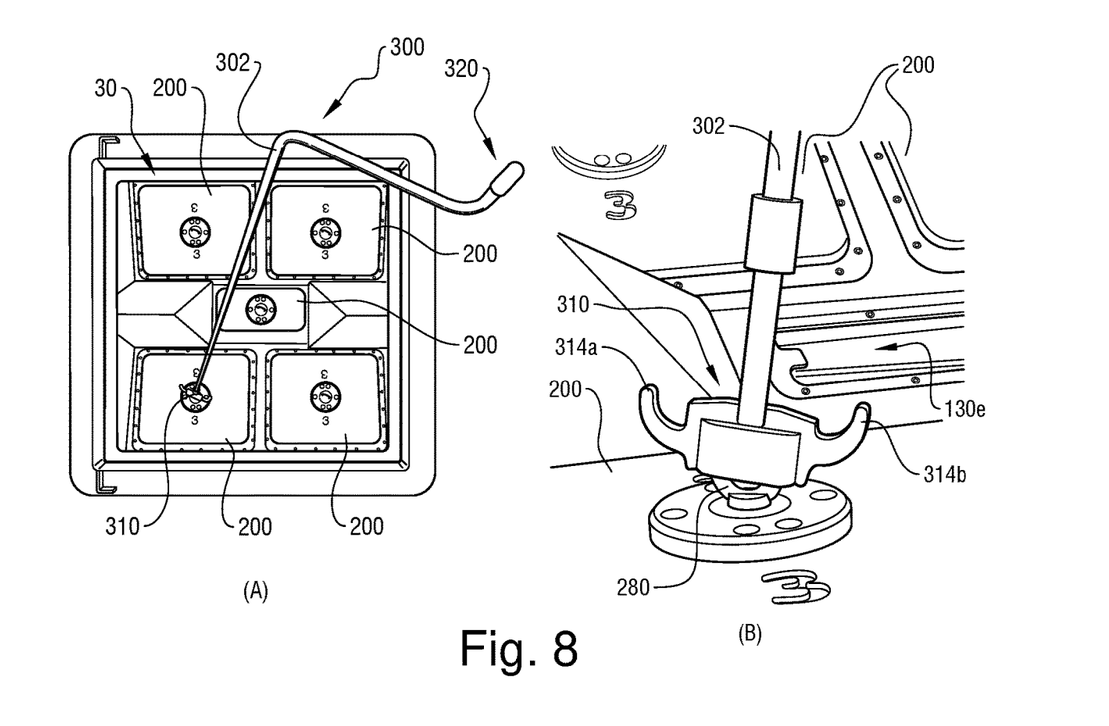
FIG. 8A illustrates the use of the operation tool of FIG. 7A in opening a compression hatch.
FIG. 8B illustrates the use of distal end of the operation tool of FIG. 7A in opening a compression hatch.
Figure 9:
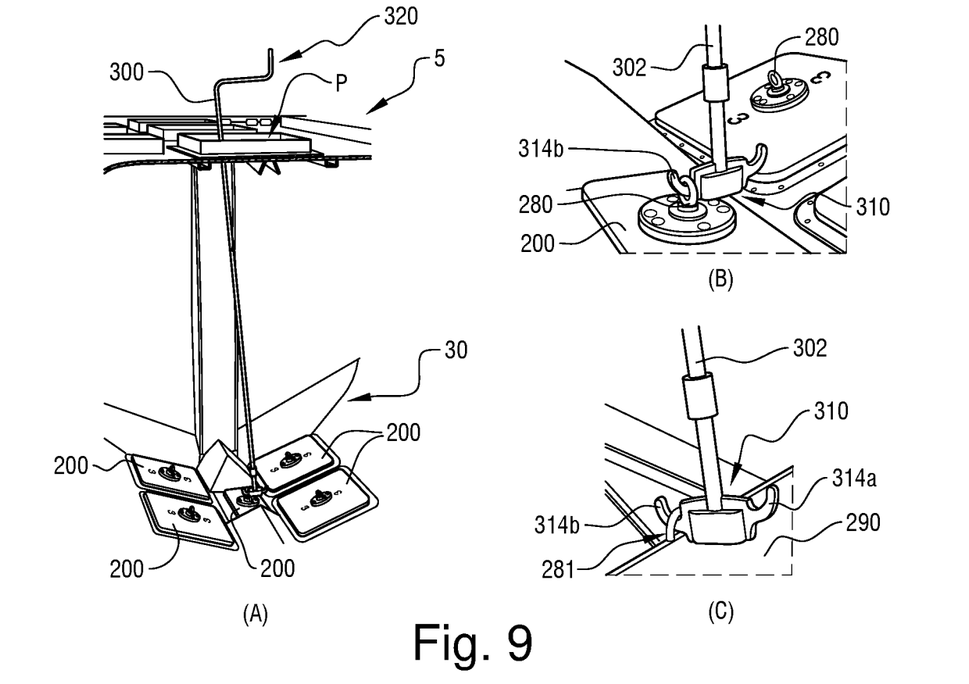
FIG. 9A illustrates the use of the operation tool with a compression hatch in one embodiment of the present disclosure.
FIG. 9B illustrates a more detailed view of the use of the operation tool in FIG. 9A.
FIG. 9C illustrates the use of the operation tool with a shedder in one embodiment of the present disclosure.

FIGS. 7-9 show a representative embodiment of an operation tool (300) and compression hatch (200) useful in the supply system. With respect to FIG. 7(A), this shows the operation tool (300) in its entirety, and FIG. 7(B) shows a distal or head portion or piece (310) of the tool (300). The tool (300) is elongate and has a handle portion (320) at one end and the engagement portion or piece (312) at the other, with a shaft (302) extending therebetween. The tool (300) is elongate since removal and attachment of the removable covers takes place through a port (P) provided at the top of the/each configurable compartment (20-30). The head piece (310) of the tool (300) includes the tool engagement interface for engaging with the hatch engagement interface, and the tool engagement interface includes a torque transmitter for transmitting the torque to the torque receiver. The torque transmitter may include or be the engagement portion or piece (312) including a socket for engaging the projection of the hatch (200) or shedder (290), i.e., a ring, eye structure, or eyebolt (280) provided on a compression hatch (200) or shedder (290). Alternatively the torque transmitter may include or be a projection, such as an eyebolt, T-shaped protection bolt, or other structure, that engages with the depression, slot or aperture in the hatch engagement interface to transmit torque from the operation tool. The head piece (310) of the tool (300) also includes the lifting-force transmitter that can include at least one hook (314*a-b*) for lowering and retrieval of hatches (200) and shedder (290). In an embodiment, the head piece (310) of the tool is detachable at a releasable collar (315) on the shaft (302). This allows other functional head pieces to be attached at the collar (315). For example, a cleaning/scraping head piece may be attached for cleaning of interior bin surfaces. This is especially important when the type of explosives material in a bin is being charged. Additionally or alternatively, one or more types of dedicated cleaning tools can be provided for cleaning interior surfaces of the bin compartments (10-40). The tool (300) will be suitably rigid so that the torque applied to the handle portion (320) is conveyed to the head piece (310), i.e., the torque transmitter at the distal end applies the torque to the cover engagement interface based on torque applied at the proximal end, wherein the torque is about a longitudinal axis of the operative tool. The tool (300) may include or be formed of stainless steel, aluminium, or other types of materials (e.g., polymer materials). The tool (300) should also be relatively lightweight so that it is easy to manipulate and use.

From a practical perspective, it is desirable that the supply system (1) can be suitably cleaned and configured/reconfigured quickly by a single operator. Including the cleaning of bin interior surfaces, it would be advantageous if the supply system can be modified for the delivery of different explosives material(s) within 1 hour, 1.5 hours, or under 2 hours.

The design of the operating tool (300) shown in FIG. 7 and how the tool (300) is used will be further understood with reference to FIGS. 8(A), 8(B) and 9. FIGS. 8(A) and 8(B) show use of the operation tool (300) to open a compression hatch (200). The eyebolt socket of the operation tool (300) is positioned over the eyebolt (280) on the hatch (200), and engaged therewith. Rotation of the tool handle (320) causes rotation of the eyebolt (280), and this will activate/deactivate the clamping mechanism of the hatch (200) depending upon direction of rotation, correspondingly causing the hatch (200) to be locked to/unlocked from the bin compartment outlet (120a-c, 130a-e) over which it resides.

FIG. 9 shows use of the operation tool (300) to retrieve a compression hatch (200) (unlocked) and shedder (290). Each operation hook (314a-b) of the tool (300) is sized to allow it to be inserted through the aperture of the eyebolt (280). The operation tool (300) is delivered and operated through a port (P) at the upper end of a given configurable compartment (20-30). In use, the handle (320) of the tool (300) will be external to the port (P), i.e., to allow installation and removal of the removable cover or lid, i.e., the compression hatch (200), by way of the port (P) without requiring any personnel to fully or partially enter into the bin.

The compression hatch (200) may be positioned over the rim (102) of an outlet (120a-c, 130a-e) from above, thereby covering the outlet (120a-c, 130a-e) from above. In an embodiment the hatch (200) includes a main body (202) having an upper side or top surface and an underside or bottom surface. The underside of the main body (202) includes a peripheral or circumferential flange (1004) by which peripheral portions of the main body (202) may rest or seat against the rim (102) of the outlet (120a-c, 130a-e).

As described in greater detail below, the hatch (200) may include a retention or clamping mechanism or means by which the hatch (200) can be selectively held against the outlet (120a-c, 130a-c) or engaged to the underside of the rim (102) of the outlet (120a-c, 130a-e), thereby securing the hatch (200) to the outlet (120a-c, 130a-e) and preventing the flow or transport of explosives material into (a) the outlet (120a-c, 130a-e) that the hatch (200) covers, and thus (b) the delivery mechanism (e.g., the augers (2a-b) or the pump) that the outlet (120a-c, 130a-e) serves. The flange (1004) on the underside of the main body (202) may include a seal or gasket, for example a retained nitrile lip seal (205), to provide a tight seal between the hatch (200) and the rim (102) of the outlet (120a-c, 130a-e).

In several embodiments, the clamping mechanism comprises a compression retaining bar, arm structure, or arm (240) that is carried or provided on or below the underside of the hatch (200), and which is selectively rotatable for further engaging the hatch (200) with the outlet (120a-c, 130a-e) over which the hatch (200) resides by rotation of the projection (e.g., the eyebolt (280)) that extends from the hatch (200). At least one compression hatch retention mechanism, for instance, a resilient or compressive biasing mechanism such as a spring assembly or spring (214), may be included to provide force or pressure to the clamping mechanism to ensure that the hatch (200) is firmly fixable/fixed and sealable/sealed to the outlet (120a-c, 130a-e) over which the hatch (200) is positioned. The hatch clamping mechanism should be easy to reliably operate (i.e., activate and deactivate) using the operation tool (300). Each hatch (200) and shedder (290) is designed for ease of application to and retrieval from an outlet (120a-c, 130a-e) in each configurable compartment (20-30).

FIGS. 10-13 show a representative embodiment of a compression hatch (200) having a selectively rotatable eyebolt (280) coupled or attached to a resiliently biased clamping mechanism (210) by which the hatch (200) is secured to an outlet (120a-c, 130a-e). The clamping mechanism (210) includes the aforementioned rotatable arm (240), which is coupled to the eyebolt (280). When the operation tool (300) is not engaged with the eyebolt (280) and the eyebolt (280) is aligned with, rotated in an lock direction (1008) to, or disposed at a first predetermined position such as a first rotational endpoint, the arm (240) is correspondingly aligned with, rotated to, or disposed at the first rotational endpoint, whereat portions of the arm (240) are retained or biased by way of the aforementioned spring assembly or spring (214) against the underside of the rim (102) of the outlet (120a-c, 130a-e) over which the hatch (200) resides, and a peripheral seal (205), such as a nitrile lip or other type of seal, carried by the underside of the main body (202) of the hatch is compressed against the upper side of the rim (102), thereby securing the hatch (200) to the outlet (120a-c, 130a-e) in a "locked" position. While this hatch (200) is in the locked position, the corresponding outlet (120a-c, 130a-e) is thus sealed, and any explosives material within the compartment (20, 30) is prevented from flowing into this outlet (120a-c, 130a-e).

The operation tool (300) includes a pushing force transmitter at its distal end to apply a pushing force to a pushing force receiver of the hatch engagement interface based on a pushing force applied along the longitudinal axis of the operative tool from the proximal end, i.e., by the handle portion (320) or a robotic arm. When the operation tool (300) is engaged with the hatch engagement interface—e.g., the eyebolt (280), and the pushing force is applied to the pushing force receiver—e.g., the eyebolt (280) is depressed, the spring (214) is compressed or further compressed, the arm (240) is pushed downward and apart from the underside of the rim (102), so it can disengage from the underside of the rim (102) of the outlet (120a-c, 130a-e). The eyebolt (280) and the arm (240) can then be rotated in an unlock direction (1006) until the eyebolt (280) and arm (240) reach a second predetermined position such as a second rotational endpoint that disposes the hatch (200) in an "unlocked" or "fully unlocked" position. In the unlocked position, the hatch (200) may be removed from the outlet (120a-c, 130a-e) and withdrawn from the bin (5) using the eyebolt (280) of the hatch (200) and a hook (314a-b) on the operation tool (300), i.e., by way of engagement of the hook (314a-b) with the eyebolt (280) followed by vertical displacement of the operation tool (300) and the hatch (200) carried thereby toward and out of the port (P) of the compartment (20-30) in which the hatch (200) had been installed.

Figure 11:
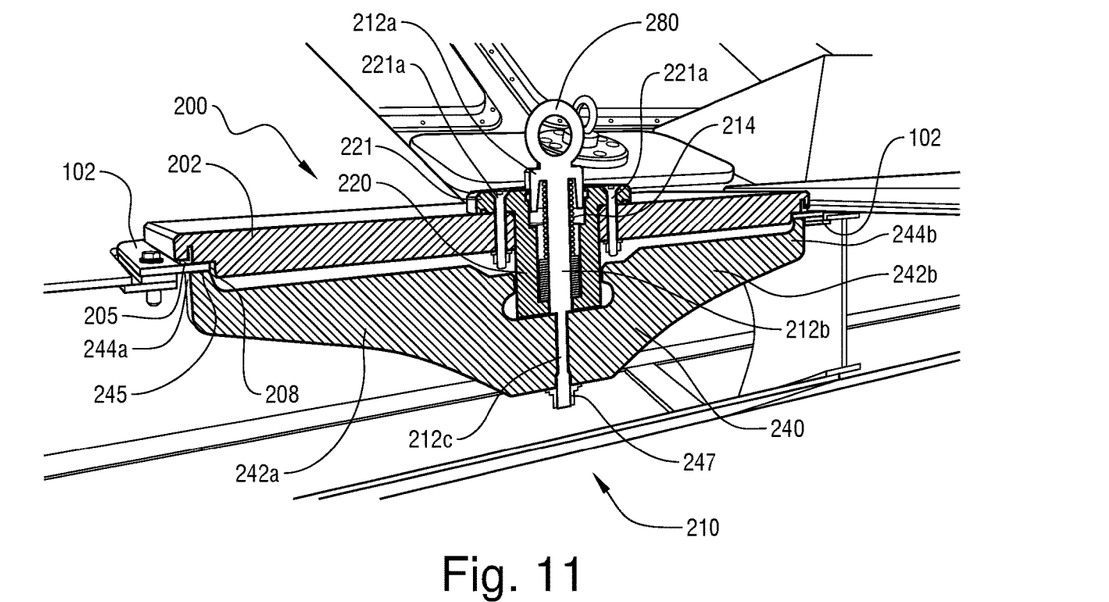
FIG. 11 illustrates a partial cross-sectional view of the compression hatch and clamping mechanism of FIG. 10 in accordance with one embodiment of the present disclosure.
Figure 12:
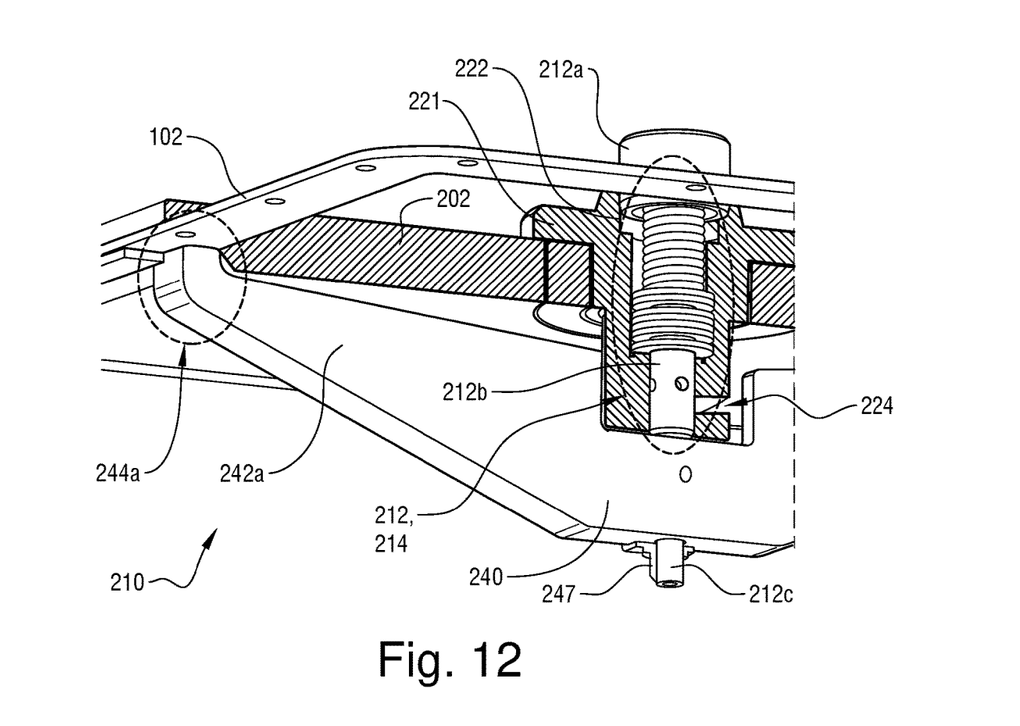
FIG. 12 illustrates another partial cross-sectional view of the compression hatch and clamping mechanism of FIG. 10 in accordance with one embodiment of the present disclosure.
Figure 13:
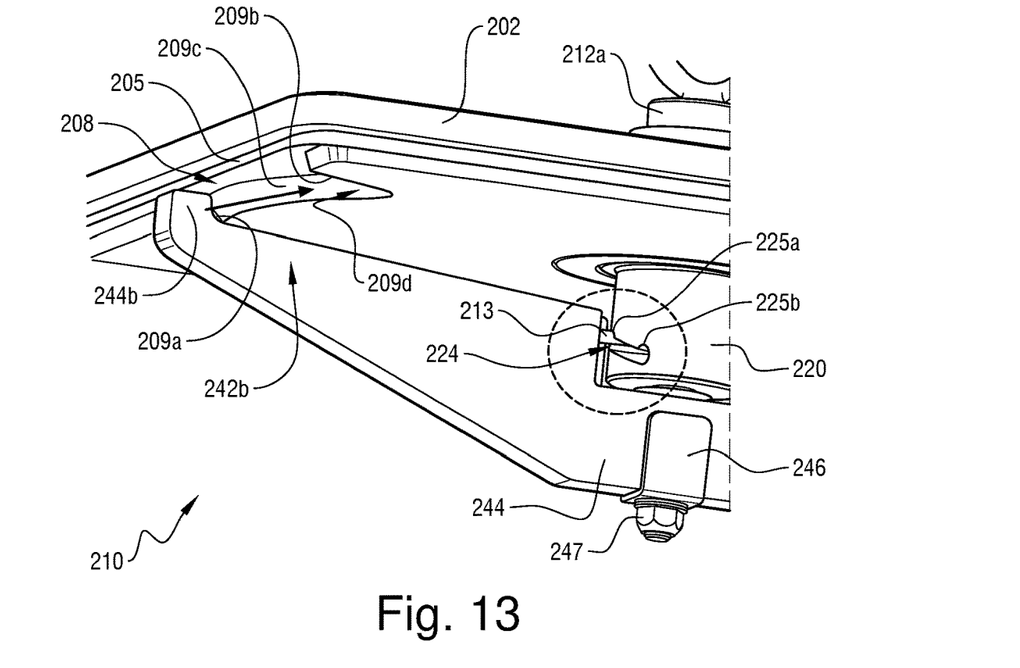
FIG. 13 illustrates another view of the compression hatch and clamping mechanism of FIG. 10 in accordance with one embodiment of the present disclosure.

In an embodiment such as that shown in FIGS. 10-13, the clamping mechanism (210) includes a rotatable spindle (212) carried within a support structure such as a sleeve or cup (220). As shown in FIGS. 10-12, the spindle (212) may be formed from portions or as the structure of the eyebolt (280) itself, or the spindle (212) may carry the eyebolt (280), depending upon embodiment details. The spindle (280) includes a head portion (212a) above which the loop or eye of the eyebolt (280) resides. The head portion (212a) resides within a seat (222) of the cup (220). The spindle (212) also includes or forms an elongate shaft (212b) that extends downwardly away from the head portion (212a). As shown in FIG. 13, the arm (240) may be coupled or secured to a distal or tail portion (212c) of the shaft (212b) by way of a bracket (246) and a fastener (247), which may be, for instance, a nut, in which case the distal portion (212c) of the shaft (212b) may be threaded.

As shown in FIGS. 10 and 11, the arm (240) may include a first arm member (242a) and a second arm member (242b)

that extend radially or laterally away from opposite sides of the shaft (212), e.g., such that the first and second arm members (242a-b) are angularly separated by 180 degrees from each other. As shown in FIG. 12, a terminal end portion of the first arm member (242a) furthest away from the shaft (212) carries a first upwardly projecting finger or finger (244a); and a terminal end portion of the second arm member (242b) furthest away from the shaft (212) carries a corresponding second upwardly projecting finger or finger (244b), each of which is configured for engaging with the underside of the rim (102) of the outlet (120a-c, 130a-e) to which the hatch (200) is secured when the hatch (200) is in the locked position. The finger (244a) engages with the rim (102) at a load-bearing contact point (245) shown in FIG. 11. The other finger (244b) engages with the rim (102) at a corresponding load-bearing contact point on the opposite side of the rim (102).

As shown in FIG. 11, the spring (214) also resides within the cup (220), and surrounds upper portions of the spindle (212). An upper portion or face of the spring (214) is disposed against the head portion (212a) of the shaft (212), and a lower portion or face of the spring (214) may be disposed against an inner support structure within the cup (220). The cup (220) may be centrally disposed with respect to vertical and horizontal cross-sections through a midpoint or center point of the top surface of the hatch (200), such that a lengthwise or longitudinal axis common to the cup (220), the spindle (212), and the spring (214) extends through this midpoint or center point of the hatch (200). The cup (220) may vertically extend through a central aperture formed in the hatch (200), and may be mounted or affixed to the hatch (200) by way of a set of fasteners (221A) such as bolts that extend through a rim structure, rim, or lip (221) corresponding to the cup (220), and nuts correspondingly affixed to these bolts.

As shown in FIG. 13, at least one post, peg, or spoke (213) is coupled or attached to the spindle (212) at a portion of the spindle (212) near the bottom of the cup (220). Each post (213) projects radially or laterally away from the spindle (212) through a corresponding angled slot (224) formed in the cup (220). The angled slot (224) includes a vertically sloping path or channel that establishes an arc through which the post (213) may be translated when the spindle (212) is rotated, e.g., by way of rotation of the eye bolt (280) using the operation tool (300) when eyebolt (280) resides within the socket of the operation tool's head piece (310) and the eyebolt (280) has been depressed using the operation tool (300). Each post (213) is engageable with or coupled to the arm (240). Consequently, when the spindle (212) is rotated, the post (213) rotates along with the spindle (212), and the arm (240) pivots as a result of rotational force transfer from the post (213). A number of embodiments may include multiple posts (213), e.g., a post (213) corresponding to each of the first arm member (242a) and the second arm member (242b).

A first or upper terminus of the angled slot (224) corresponds to or at least in part defines the first rotational endpoint of the eyebolt (280) at which the compression hatch (200) is in the locked position, and a second or lower terminus of the angled slot (224) corresponds to or at least in part defines the second rotational endpoint of the eyebolt (280) at which the compression hatch (200) is in the unlocked position. The angled slot (224) may include a first upwardly directed recess (225a) at its first terminus, and a second upwardly directed recess (225b) at its second terminus, such that in the absence of downward compressive force applied to the spring (214), the spring (214) resiliently biases the post (213) in the first upwardly directed recess (225a) when the compression hatch (200) is in the locked position, or the second upwardly directed recess when the compression hatch (200) is in the unlocked position. Thus, the shaft (212) is not freely rotatable when the compression hatch (200) is in the locked position or the unlocked position. Rather transitioning the compression (200) hatch from the locked position to the unlocked position or vice-versa requires the application of downward force to the spring (212) by way of the eyebolt (280) before the shaft (212) may be rotated to effectuate such transitioning.

When the arm (240) is rotated by way of the aforementioned rotation in the unlock direction (1006) or the lock direction (1008) of the eyebolt (280), the first and second fingers (244a-b) of the arm (240) correspondingly pivot about the shaft (212). The underside of the main body (202) of the compression hatch (200) may include a catch or location spigot (208) corresponding to each upwardly projecting finger (244a-b). Each catch (208) is shaped and configured for constraining or confining the angular range across which a finger (244a-b), and hence the arm (240), can rotate, in a cooperative or coordinated manner with respect to the first and second termini, and hence the first and second upwardly directed recesses (225a-b), of the angled slot (224). The catch (208) corresponding to a given finger (244a-b) may include a first edge or wall (209a), a second edge or wall (209b), and an inner edge or wall (209c) therebetween. The inner wall (209c) forms a notch (209d) between the first and second walls (209a-b), which is directed away from the periphery of the main body (202) of the hatch (200), and which includes an apex that is offset closer to the second wall (209b) than the first wall (209a).

When the eyebolt (280) and the arm (240) are disposed at the first rotational endpoint, the finger (244a-b) abuts the first edge (209a) of the catch (208), and the finger (244a-b) and the arm (240) are disposed or approximately disposed midway along the length of a predetermined side of the compression hatch (200). Moreover, the finger (244a-b) is biased upwardly by way of the spring (214) against the underside of the rim (102) of the outlet (120a-c, 130a-e) to which the compression hatch (200) is applied; and the post (213) is biased upwardly by way of the spring (214) into the first upwardly directed recess (225a), thus securing the compression hatch (200) in the locked position.

Once the eyebolt (280) has been depressed using the operation tool (300) using an amount of downward force sufficient to overcome the upward spring force that biases the post (213) into the first upwardly directed recess (225a), the finger (244a-b) correspondingly disengages or separates from the underside of the rim (102) of the outlet (120a-c, 130a-e). Subsequent rotation of the eyebolt (280) in a direction toward the second rotational endpoint causes rotation of the arm (240) and hence rotation of the finger (244a-b) away from the first wall (209a) toward the second wall (209b) of the catch (208). As the arm (240) and the finger (244a-b) move toward the second wall (209b) of the catch (208), the finger (244a-b) progressively shifts or slides into the notch (209d) of the catch (208), and the arm (240) and the finger (244a-b) become more closely aligned with the diagonal or longest dimension of the main body (202), which exceeds the lateral span of the arm (240). When the finger (244a-b) reaches and abuts the second wall (209b) of the catch (208) and downward force upon the eyebolt (280) is discontinued, the spring (214) biases the post (213) into the second upwardly directed recess (225b), and the compression hatch (200) is in the fully unlocked and secured position and can be removed or lifted away from the outlet (120a-c, 130a-e).

Prior to changing the configuration of a given configurable compartment (20, 30), i.e., prior to transitioning a first compression cover arrangement within the compartment (20, 30) corresponding to a first delivery mechanism to a distinct second compression cover arrangement corresponding to a distinct second delivery mechanism, the compartment (20, 30) is thoroughly cleaned to eliminate all residual explosives material therefrom, after which the compartment (20-30) configuration can be changed. One or more types of cleaning tools, devices, or mechanisms can be provided to facilitate or enable compartment cleaning. The cleaning tools are designed such that a single operator can clean the inside of any or each compartment (20, 30) from outside of the bin (5), e.g., while their lower body and majority of their torso remain external to the bin (5), without requiring the presence of an assisting operator inside the bin (5). Such cleaning tools typically include an elongate shaft having a distal portion at which a cleaning brush or pad is attachable or resides, and an upper or proximal portion that serves as a handle by which the cleaning tool is manipulated.

Figure 14:
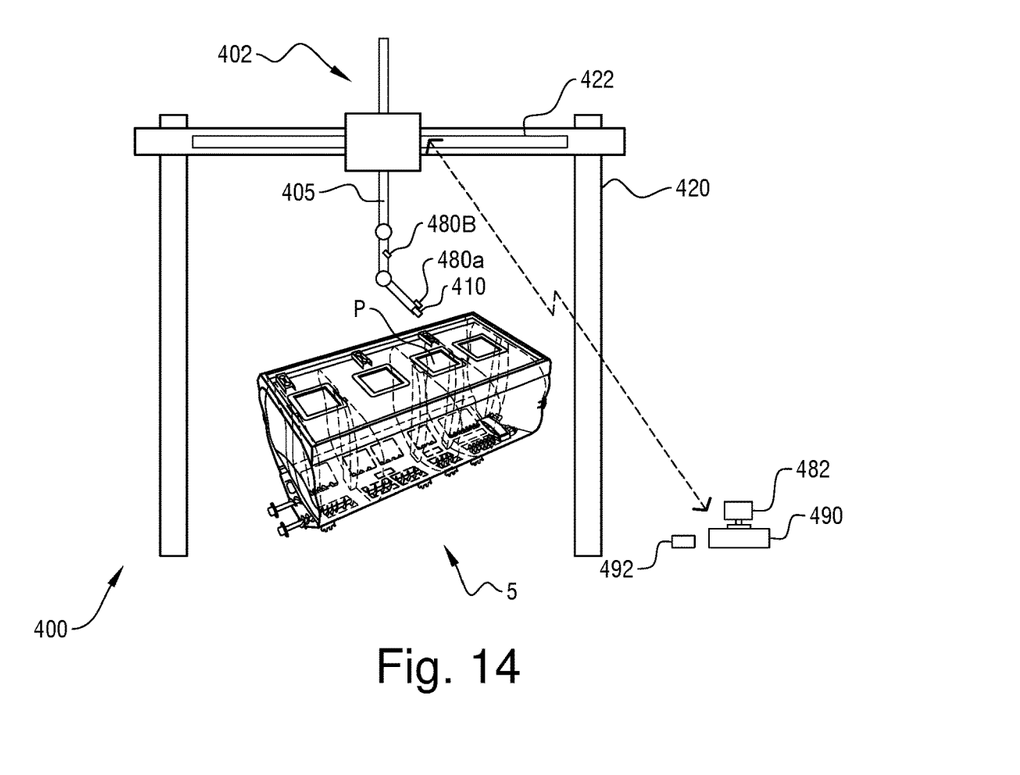
FIG. 14 illustrates a robotic control system that is useful in configuring or reconfiguring the compartments of the bin in accordance with one embodiment of the present disclosure.

In some embodiments such as that shown in FIG. 14, selective (re)configuration of compartments (20, 30) and/or compartment cleaning can be performed by way of a robotic control system 400. For instance, the operation tool (300) can include or be an automated or semi-automated apparatus or device, such as a robotic manipulator (402) configured for accessing the interiors of configurable bin compartments (10, 20), and installing compression hatches (200) onto and removing compression hatches (200) from particular outlets (120a-c, 130a-e) within such compartments (10, 20) on a selective, selectable, or programmably controlled basis. In an embodiment, the robotic manipulator (402) includes an elongate arm (405) having a plurality of articulatable joints; plus an end effector (410) carried at a distal end of the elongate arm (405). The robotic manipulator (402) further includes or is coupled to a control unit (490) such as a computer system configured for controlling the operation(s) of the robotic manipulator, such as by way of a processing unit (e.g., microprocessor or microcontroller) that executes program instruction sets stored in a memory, in a manner readily understood by individuals having ordinary skill in the relevant art. The robotic manipulator (402) and the control unit/computer system (490) can each include a communication unit for transferring signals and data between each other. For instance, each of the robotic manipulator (402) and the control unit (490) can include a wireless communication unit configured for transferring information wirelessly (indicated by the dashed line in FIG. 14) in accordance with a standard wireless data communication protocol, in a manner readily understood by individuals having ordinary skill in the relevant art. Alternatively, communication between the robotic manipulator (402) and the control unit (490) may be wire-based.

The robotic manipulator (400) also typically operates in association with or include a machine vision system, apparatus, or device, such as one or more cameras (480a-b) that capture video or images while in use. For instance, a first camera (480a) can be carried by a portion of the arm (405), and can be configured for capturing video and/or images of the end effector (410) while the end effector (410) is in use. Moreover, the same camera (480a) and/or another camera (480b) can be configured for capturing video and/or images of portions of the interior of the compartment (10, 20). One or each of such cameras (480a-b) may be selectively positionable/aimable.

The robotic manipulator (402) typically also includes a set of user interface devices, for instance, a display device (482) that operates in association with or which forms a portion of the machine vision system or apparatus and/or the control unit (490), and which is configured to present video and/or image signals captured by the camera(s) (480a-b); and one or more types of control devices. The user interface device(s) may include a hand-operable or hand-held controller (492) such as a joystick and a set of buttons by which the arm (405) and the end effector (410) may be moved and positioned, and the end effector (410) may be operated or actuated.

The robotic manipulator (402) may be carried or mounted over or above an MMU, e.g., on a gantry structure (420) above the MMU's bin (5) that includes a support track (422) along which the robotic manipulator (402) may be selectively moved or positioned such that portions of the robotic manipulator (402) are insertable into and operable within a compartment (10, 20) under consideration, e.g., by way of accessing the compartment's port (P) and lowering and/or extending the robotic manipulator's arm (405) into the compartment (10, 20), such that the end effector (410) is capable of installing and uninstalling one or more removable cover(s) in a compartment (10, 20). The end effector (410) is configured for accessing, interfacing with, and operating a cover engagement and actuation mechanism, such that a removable cover can be installed and locked onto an outlet (120a-c, 130a-c) or unlocked and removed from an outlet (120a-c, 130a-e).

The structural design of the end effector (410) and the cover engagement and actuation mechanism may vary depending upon embodiment details. For instance, in some (though not necessarily all) embodiments, the end effector (410) and the cover engagement and actuation mechanism include structural elements that are essentially identical or analogous to the representative embodiments described above with reference to FIGS. 7-13.

In certain embodiments that include robotic operation tools, multiple robotic manipulators (402) (e.g., mounted on one or more gantry structures above an MMU) may access the interiors of multiple compartments (20, 30) during the same time interval or in a concurrent manner. For instance, one robotic manipulator (402) may access or operate within the first configurable compartment (20), while another robotic manipulator (not shown) accesses or operates within the second configurable compartment (30), in a manner readily understood by individuals having ordinary skill in the relevant art in view of the description herein.

The invention claimed is:
1. An apparatus including a supply system that is adapted for supplying at least a first explosives material, the supply system comprising:
  at least a first explosives material delivery mechanism;
  a bin having an upper end, a lower end, and an interior volume that provides at least a first compartment for storing the first explosives material, the first compartment having a corresponding lower end;
  two or more outlets provided at the lower end of the first compartment for feeding the first explosives material from the first compartment, wherein the two or more outlets include a first outlet for feeding the first explosives material to the first explosives material delivery mechanism, and a second outlet configured to feed explosive material to the first explosives material delivery mechanism or a second explosives material delivery mechanism;

at least a first removable cover for the second outlet, the first removable cover is installable on and removable from the second outlet;

a port provided at the upper end of the bin by which the first explosives material is loadable into the first compartment; and an operation tool that is adapted to allow installation and removal of the first removable cover by insertion of the operation tool through the port without requiring any personnel to fully or partially enter into the bin.

2. The apparatus of claim 1, wherein the supply system comprises:

the second explosives material delivery mechanism;

the second outlet provided at the lower end of the first compartment for feeding a second explosives material from the first compartment to the second explosives material delivery mechanism; and a second removable cover for the first outlet, and installable thereon and removable therefrom, wherein the operational tool is adapted to allow installation and removal of the second removable cover by insertion of the operation tool through the port without requiring any personnel to fully or partially enter into the bin.

3. The apparatus of claim 2, wherein the first explosives material delivery mechanism and the second explosives material delivery mechanism are of the same type as each other.

4. The apparatus of claim 1 comprising a mechanical platform for transporting the supply system.

5. The apparatus of claim 1, wherein the bin comprises one or more non-configurable compartments, and the compartments may be formed by subdividing the bin.

6. The apparatus of claim 1, wherein the first explosives material delivery mechanism comprises at least one of a pump or an auger.

7. The apparatus of claim 1, wherein the first removable cover comprises at least one sealing, retention, or clamping mechanism to secure the cover over the second outlet, wherein the at least one sealing, retention, or clamping mechanism of the removable cover can be activated and deactivated using the operation tool without requiring any personnel to fully or partially enter into the bin, wherein the cover is optionally held against the second outlet by the at least one sealing, retention, or clamping mechanism engaging to an underside of a rim of the second outlet.

8. The apparatus of claim 1, wherein the second outlet comprises a corresponding rim structure against which predetermined peripheral portions of an underside of the first removable cover rest when the first removable cover is seated over the second outlet.

9. The apparatus of claim 1, wherein the first removable cover comprises a hatch engagement interface by which a tool engagement interface of the operation tool can matingly engage with and operate or manipulate the first removable cover.

10. The apparatus of claim 9, wherein the hatch engagement interface includes or is a torque receiver for receiving torque from the operation tool, the hatch engagement interface being engageable by the tool engagement interface of the operation tool, and optionally the torque receiver includes or is a projection that extends from an upper surface of the first removable cover, and the tool engagement interface of the operation tool includes a torque transmitter for transmitting the torque to the torque receiver, and optionally the torque transmitter includes or is a recess or socket for engaging the projection of the removable cover.

11. The apparatus of claim 9, wherein the hatch engagement interface includes or is a lifting-force receiver for receiving a lifting force from the operation tool, and which is engageable by the tool engagement interface of the operation tool, and optionally the lifting-force receiver includes or is a projection that extends from an upper surface of the first removable cover, and the tool engagement interface of the operation tool includes a lifting-force transmitter for transmitting the lifting force to the lifting-force receiver, and optionally the lifting-force transmitter includes or is a hook for engaging the projection of the removable cover.

12. The apparatus of claim 9, wherein the hatch engagement interface includes or is a pushing-force receiver for receiving a pushing force from the operation tool, and which is engaged by the tool engagement interface of the operation tool, and optionally the pushing-force receiver includes or is a projection that extends from an upper surface of the first removable cover, and the tool engagement interface of the operation tool includes a pushing-force transmitter for transmitting the pushing force to the pushing-force receiver, and optionally the pushing-force transmitter includes or is a recess or socket for engaging the projection of the removable cover.

13. The apparatus of claim 1, wherein the supply system comprises at least one shedder for placing over the first removable cover to facilitate or ensure flow of the first explosives material to other outlets that are uncovered, wherein the shedder includes a shedder engagement interface that allows the shedder to be positioned and removed using the operation tool by insertion through the port without requiring any personnel to fully or partially enter into the bin, wherein the shedder engagement interface optionally includes or is a projection that extends from an upper surface of the shedder.

14. The apparatus of claim 1, wherein the operation tool comprises an elongate structure with a gripping portion at one end, and a cover engagement and actuation mechanism at the other end.

15. The apparatus of claim 1, wherein the operation tool comprises an elongate structure with one or more robotic manipulators, actuators, or arms having a cover engagement and actuation mechanism, structure, or element, at a distal end.

16. The apparatus of claim 1, wherein the operation tool extends downwardly through the port in a direction from the upper end of the bin to the lower end of the bin to engage the first removable cover.

17. A method for supplying at least a first explosives material comprising:

installing a first removable cover over a first outlet at a lower end of a compartment using an operation tool inserted through a port at an upper end of the compartment without requiring any personnel to fully or partially enter into the compartment, wherein the installing optionally includes applying a locking torque to the first removable cover using the operation tool;

loading the first explosives material into the compartment by the port;

storing the first explosives material in the compartment; and feeding the first explosives material from the compartment to a first explosives material delivery mechanism by a second outlet at the lower end of the compartment.

18. The method of claim 17 including any one or more of:
cleaning the first explosives material by insertion of the operation tool through the port from the compartment without requiring any personnel to fully or partially enter into the compartment;
unlocking the first removable cover by insertion of the operation tool through the port without requiring any personnel to fully or partially enter into the bin, optionally by applying a pushing force and then an unlocking torque to the first removable cover using the operation tool;
removing the first removable cover by insertion of the operation tool through the port without requiring any personnel to fully or partially enter into the bin, optionally by applying a lifting force to the first removable cover using the operation tool;
installing a second removable cover over the second outlet using the operation tool by insertion through the port without requiring any personnel to fully or partially enter into the compartment;
loading a second explosives material into the compartment by the port;
storing the second explosives material in the compartment;
feeding the second explosives material from the compartment to a second explosives material delivery mechanism by the second outlet;
transporting the compartment by a mechanical platform;
manipulating the operation tool using a handle or one or more robotic manipulators, actuators, or arms to apply the locking torque to the first removable cover;
subdividing the bin to form the compartments, including non-configurable compartments;
clamping the first removable cover over the second outlet, optionally by engaging to an underside of a rim of the second outlet;
engaging the operation tool with the first removable cover, optionally including transmitting torque, transmitting at least one of a lifting-force or a pushing force; and
placing a shedder over the first removable cover to facilitate or ensure flow of the first explosives material to the second outlet that is uncovered, including positioning the shedder using the operation tool insertion through of the port without requiring any personnel to fully or partially enter into the bin.

19. An apparatus including a supply system that is adapted for supplying at least a first explosives material, the supply system comprising:
at least a first explosives material delivery mechanism;
a bin having an upper end, a lower end, and an interior volume that provides at least a first compartment for storing the first explosives material, the first compartment having a corresponding lower end;
at least a first outlet provided at the lower end of the first compartment for feeding the first explosives material from the first compartment to the first explosives material delivery mechanism;
at least a first removable cover for a second outlet at the lower end of the compartment, the first removable cover is installable on and removable from the second outlet, wherein the second outlet comprises a corresponding rim structure against which predetermined peripheral portions of an underside of the first removable cover rest when the first removable cover is seated over the second outlet;
a port provided at the upper end of the bin by which the first explosives material is loadable into the first compartment; and
an operation tool that is adapted to allow installation and removal of the first removable cover by insertion of the operation tool through the port without requiring any personnel to fully or partially enter into the bin.

20. An apparatus including a supply system that is adapted for supplying at least a first explosives material, the supply system comprising:
at least a first explosives material delivery mechanism;
a bin having an upper end, a lower end, and an interior volume that provides at least a first compartment for storing the first explosives material, the first compartment having a corresponding lower end;
at least a first outlet provided at the lower end of the first compartment for feeding the first explosives material from the first compartment to the first explosives material delivery mechanism;
at least a first removable cover for a second outlet at the lower end of the compartment, the first removable cover is installable on and removable from the second outlet;
a port provided at the upper end of the bin by which the first explosives material is loadable into the first compartment;
an operation tool that is adapted to allow installation and removal of the first removable cover by insertion of the operation tool through the port without requiring any personnel to fully or partially enter into the bin; and
at least one shedder for placing over the first removable cover to facilitate or ensure flow of the first explosives material to other outlets that are uncovered, wherein the shedder includes a shedder engagement interface that allows the shedder to be positioned and removed using the operation tool by insertion through the port without requiring any personnel to fully or partially enter into the bin, wherein the shedder engagement interface optionally includes or is a projection that extends from an upper surface of the shedder.

* * * * *

UNITED STATES PATENT AND TRADEMARK OFFICE
CERTIFICATE OF CORRECTION

| | |
|---|---|
| PATENT NO. | : 12,000,686 B2 |
| APPLICATION NO. | : 15/733563 |
| DATED | : June 4, 2024 |
| INVENTOR(S) | : Bryce Owen Major et al. |

It is certified that error appears in the above-identified patent and that said Letters Patent is hereby corrected as shown below:

In the Claims

At Column 21, Line 45 (Claim 18, Line 45), please delete "through of the port" and insert --through the port-- therefor.

Signed and Sealed this
Thirtieth Day of July, 2024

Katherine Kelly Vidal
*Director of the United States Patent and Trademark Office*